US012810670B2

(12) United States Patent
Gopavaram et al.

(10) Patent No.: US 12,810,670 B2
(45) Date of Patent: Nov. 24, 2026

(54) DOOR LOCK WITH AUTHENTICATION MODULE

(71) Applicant: Carrier Corporation, Palm Beach Gardens, FL (US)

(72) Inventors: Subhash Reddy Gopavaram, Hyderabad (IN); Rajesh Athelly, Hyderabad (IN); Yuri Novozhenets, Pittsford, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 25 days.

(21) Appl. No.: 17/889,470

(22) Filed: Aug. 17, 2022

(65) Prior Publication Data

US 2023/0065459 A1 Mar. 2, 2023

Related U.S. Application Data

(60) Provisional application No. 63/237,251, filed on Aug. 26, 2021.

(51) Int. Cl.
*G07C 9/00* (2020.01)
*E05B 47/00* (2006.01)

(52) U.S. Cl.
CPC ...... *G07C 9/00563* (2013.01); *E05B 47/0001* (2013.01); *G07C 9/00904* (2013.01); *E05Y 2400/81* (2013.01); *G07C 2009/00769* (2013.01)

(58) Field of Classification Search
CPC ............ G07C 9/00563; G07C 9/00904; G07C 2009/00769; E05B 47/0001; E05Y 2400/81
USPC ........................................................ 70/283.1
See application file for complete search history.

(56) References Cited

U.S. PATENT DOCUMENTS

| | | | | |
|---|---|---|---|---|
| 10,032,327 | B1 * | 7/2018 | Xin | G07C 9/00563 |
| 10,738,504 | B2 * | 8/2020 | Uyeda | G07C 9/00182 |
| 2004/0164845 | A1 * | 8/2004 | Hwang | G07C 9/00563 340/5.7 |
| 2013/0027180 | A1 * | 1/2013 | Lakamraju | G07C 9/257 340/5.52 |
| 2016/0364009 | A1 * | 12/2016 | Lemberger | H04N 21/4424 |
| 2017/0358160 | A1 * | 12/2017 | Gardiner | G07C 9/00571 |
| 2018/0108192 | A1 * | 4/2018 | Ho | G07C 9/253 |
| 2018/0171660 | A1 * | 6/2018 | Snider | B32B 27/06 |
| 2018/0266145 | A1 | 9/2018 | Chou | |
| 2019/0338560 | A1 * | 11/2019 | Ali | E05B 45/06 |
| 2020/0349786 | A1 | 11/2020 | Ho et al. | |

FOREIGN PATENT DOCUMENTS

CN 110748241 A * 2/2020 ............. E05B 49/00

OTHER PUBLICATIONS

European Search Report for European Application No. 22191131.6; Report Mail Date Jan. 3, 2023 (pp. 1-7).

* cited by examiner

*Primary Examiner* — Kristina R Fulton
*Assistant Examiner* — James Edward Ignaczewski
(74) *Attorney, Agent, or Firm* — CANTOR COLBURN LLP

(57) ABSTRACT

A system for a door includes a door lock having a handle assembly and a lock. The lock is movable between an engaged position and a disengaged position. An authentication module is mounted to the door lock at a position offset from a surface of the door. The authentication module is operably coupled to the lock.

15 Claims, 12 Drawing Sheets

DOOR LOCK WITH AUTHENTICATION MODULE

CROSS-REFERENCE TO RELATED APPLICATIONS

This application claims the benefit of U.S. Provisional Application No. 63/237,251 filed Aug. 26, 2021, the disclosure of which is incorporated herein by reference in its entirety.

BACKGROUND

Exemplary embodiments of the present disclosure relate to the art of a door lock, and more particularly, to a door lock that actuates in response to authentication information.

Door locks that are operable in response to information or data that is recorded on a card and read by a card reader are commonly used, such as on a guest room door in a hotel. This kind of door lock may include a dead bolt or latch that is movable between an engaged and a disengaged position in conjunction with the rotation of a handle. In existing systems, the card reader is either located remotely from the door lock, or as shown in FIG. 1, a portion of the door lock, such as the door handle 12 extends through a portion of the housing of the card reader 10. Typical configurations that have the door lock and the card reader co-located at the door provide limited accessibility of the card reader (e.g., the antenna of the card reader may be partially blocked by the handle and/or the antenna may only be able to read the card when the card is at a specific location), which results in less than ideal convenience for the end user.

BRIEF DESCRIPTION

According to an embodiment, a system for a door includes a door lock having a handle assembly and a lock. The lock is movable between an engaged position and a disengaged position. An authentication module is mounted to the door lock at a position offset from a surface of the door. The authentication module is operably coupled to the lock.

In addition to one or more of the features described above, or as an alternative to any of the foregoing embodiments, the authentication module is oriented at a non-parallel angle to the surface of the door.

In addition to one or more of the features described above, or as an alternative to any of the foregoing embodiments the authentication module is mounted adjacent to an end of the handle assembly.

In addition to one or more of the features described above, or as an alternative to any of the foregoing embodiments the authentication module includes a housing, the housing being integrally formed with the handle assembly.

In addition to one or more of the features described above, or as an alternative to any of the foregoing embodiments the authentication module and the handle assembly being movable about an axis of rotation in unison.

In addition to one or more of the features described above, or as an alternative to any of the foregoing embodiments the authentication module is coupled to the handle assembly, and at least a portion of the handle assembly is movable about an axis of rotation relative to the authentication module.

In addition to one or more of the features described above, or as an alternative to any of the foregoing embodiments the handle assembly further comprises a rod and a handle extending perpendicularly from the rod, the handle being movable relative to the authentication module.

In addition to one or more of the features described above, or as an alternative to any of the foregoing embodiments the authentication module is configured to actuate the lock from the engaged position to the disengaged position in response to receiving valid authentication data.

In addition to one or more of the features described above, or as an alternative to any of the foregoing embodiments the valid authentication data is provided by a portable device.

In addition to one or more of the features described above, or as an alternative to any of the foregoing embodiments the authentication module further comprises a housing; a cover connected to the housing to define a cavity between the housing and the cover; and a control board and at least one detector for receiving authentication data arranged within the cavity.

In addition to one or more of the features described above, or as an alternative to any of the foregoing embodiments a logo is displayed on the cover and a detection region associated with the at least one detector is arranged at a center of the logo.

In addition to one or more of the features described above, or as an alternative to any of the foregoing embodiments the authentication module is configured to perform a biometric recognition operation.

In addition to one or more of the features described above, or as an alternative to any of the foregoing embodiments the at least one detector is an antenna, and the antenna extends about a periphery of the cavity.

In addition to one or more of the features described above, or as an alternative to any of the foregoing embodiments the door lock further comprises an actuator connected to the lock, the control board being arranged in communication with the actuator.

In addition to one or more of the features described above, or as an alternative to any of the foregoing embodiments the control board is hard-wired to the actuator via at least one wire.

In addition to one or more of the features described above, or as an alternative to any of the foregoing embodiments the at least one wire is extends from the cavity through a portion of the handle assembly.

In addition to one or more of the features described above, or as an alternative to any of the foregoing embodiments the control board is configured to wirelessly communicate with the actuator.

According to an embodiment, a system for a door include a door lock having a handle assembly and an authentication module mounted to the door lock at a position offset from a surface of the door. The authentication module includes a display screen operable to portray a message.

In addition to one or more of the features described above, or as an alternative to any of the foregoing embodiments the message is a static message.

In addition to one or more of the features described above, or as an alternative to any of the foregoing embodiments the authentication module further comprises a microphone and a speaker and the display screen is operable to perform a video conference.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
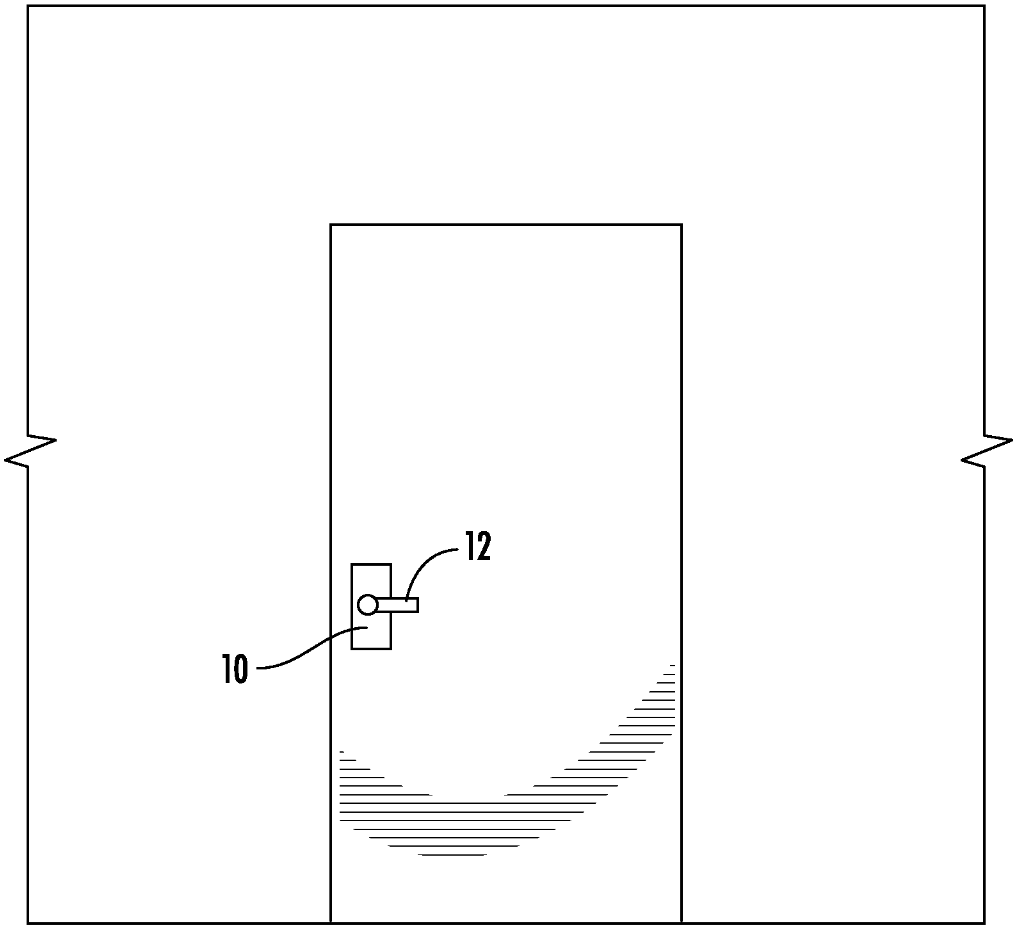
FIG. 1 (PRIOR ART)
FIG. 1 is a schematic diagram of an example of a prior art door including a door lock and a corresponding card reader.

A detailed description of one or more embodiments of the disclosed apparatus and method are presented herein by way of exemplification and not limitation with reference to the Figures.

With reference now to FIGS. 2-8, an example of a door 20 having an electric door lock 22 and an authentication module associated with or operably coupled to the electric door lock is illustrated. As shown, the door lock 22 may include a handle assembly 24 having a rod 26 that extends into or through a portion of the door 20 and a handle 28. The rod 26 is configured to define an axis of rotation X of the door lock 22. The handle 28 may be connected to a portion of the rod 26, near an end thereof arranged external to the door 20, such as in front of a surface 21 of the door 20. In embodiments where the handle 28 is a lever, the handle 28 may extend substantially perpendicular to rod 26. The handle 28 may be integrally formed with the rod 26 such that the handle 28 and the rod 26 are configured to rotate about the axis of rotation X together in response to application of a force to the distal end 30 of the handle 28 for example.

Figure 2:
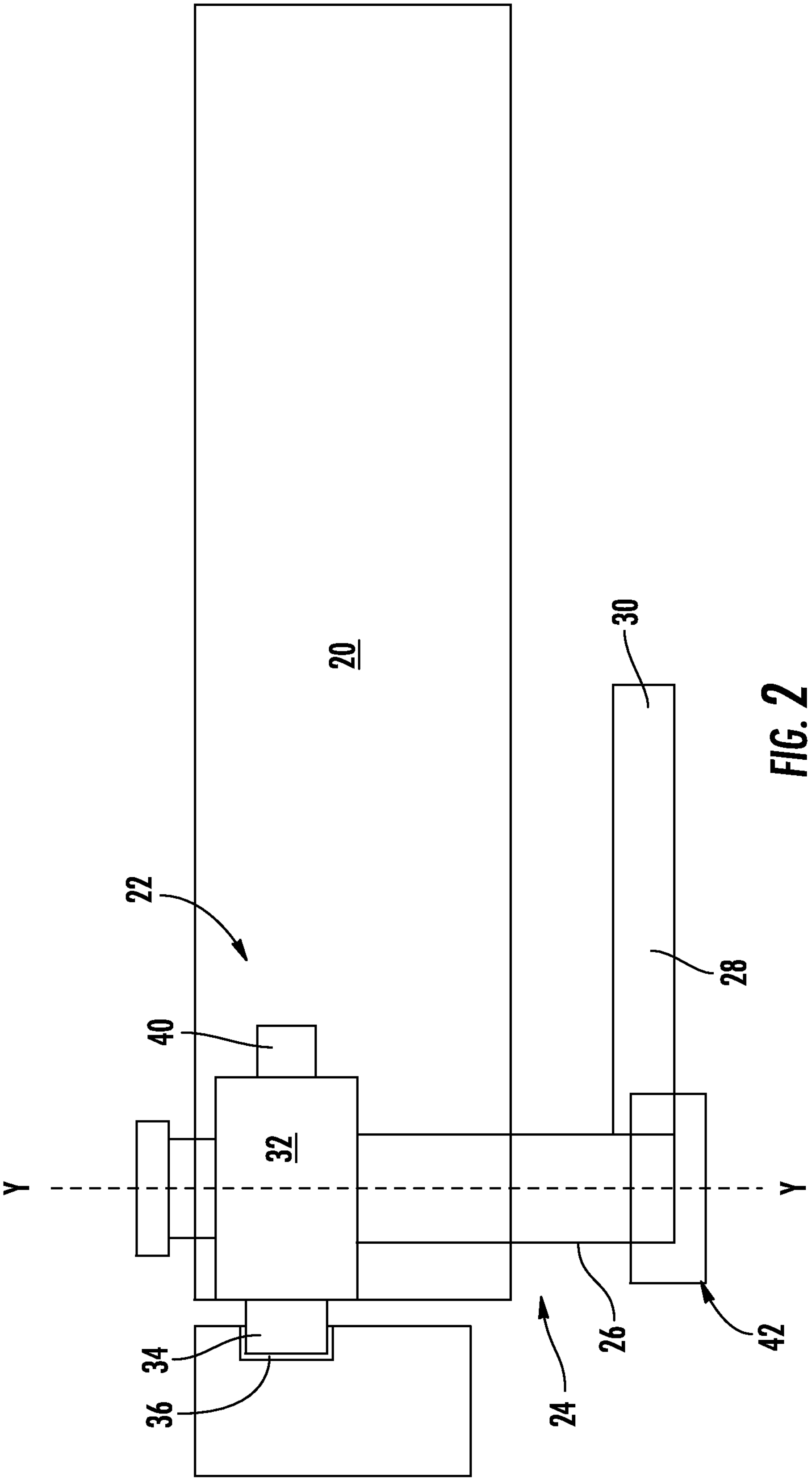
FIG. 2 is a cross-sectional schematic diagram of a door including a door lock and a corresponding authentication module according to an embodiment.

As shown in FIG. 2, the door lock 22 may additionally include a cylinder 32 arranged within the interior of the door 20 and coupled directly to or indirectly to the rod 26. In operation, rotation of the handle 28 may cause the cylinder 32 and a respective latch 34 extending radially outwardly from the cylinder 32 to rotate and separate from a groove 36 of a corresponding faceplate arranged at an opposite surface, such as a wall or a doorframe for example.

Figure 3:
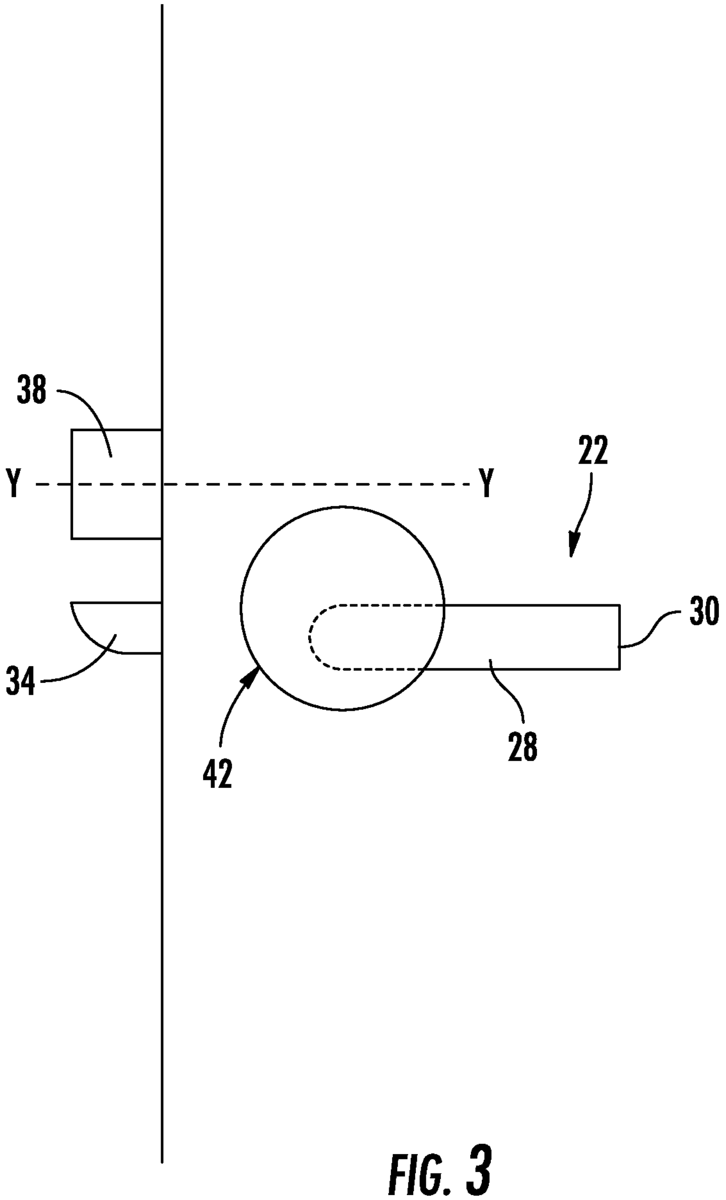
FIG. 3 is a front view of a door including a door lock and a corresponding authentication module according to an embodiment.
Figure 8:
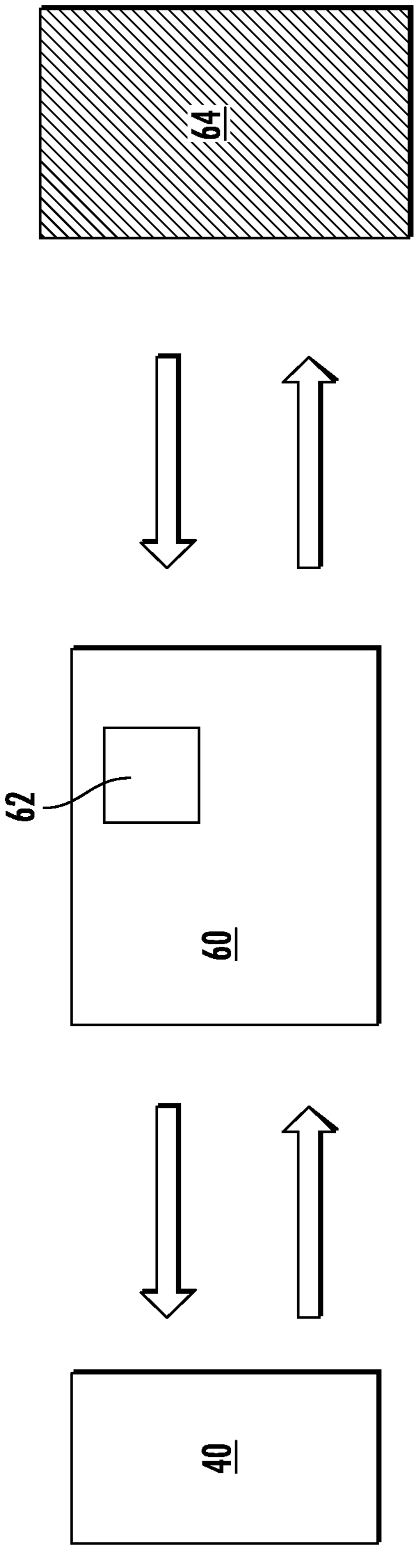
FIG. 8 is a schematic diagram of the communication between the door lock and the authentication module in response to a portable device according to an embodiment.

With continued reference to FIG. 2 and further reference to FIG. 3, the door lock 22 may additionally include a lock 38, such as a deadbolt for example, located at position vertically offset from the cylinder 32 and/or the latch 34. The lock 38 may be configured to translate or slide along an axis Y in and out of the door 20 for engagement with another groove (not shown) formed in a wall or doorframe opposite the end of the door 20. In an embodiment, a motor or actuator, illustrated schematically at 40 in FIG. 8, is arranged within the interior of the door 20 and is operably coupled to the lock 38. The actuator 40 may be selectively energized to drive movement of the lock 38 along its axis Y to actuate the lock 38 between an engaged position or locked position and a disengaged position or unlocked position. It should be understood that the configuration of the door lock 22 illustrated and described herein is intended as an example only and that a door lock 22 having any suitable configuration is within the scope of the disclosure.

As shown, an authentication module 42 associated with the door lock 22 is mounted to the door 20 at a location or position offset from the surface 21 of the door 20. In the illustrated, non-limiting embodiment, the authentication module 42 is mounted generally forward of or at a foremost end of the door lock 22. By positioning the authentication module at such a location, a desired logo, such as a continuous circle for example, may be displayed on the authentication module 42 without interference by the door handle 28. The authentication module 42 may be oriented at a non-parallel angle (best shown in FIGS. 6A-6B) to the adjacent surface 21 of the door 20, such that a contact surface 44 of the authentication module 42 faces upwardly, for example towards a ceiling. This non-parallel angle may provide increased accessibility to the authentication module 42 (e.g., by removing, or at least mitigating, the ability of the antenna of the authentication module from being blocked by the handle). In an embodiment, the authentication module is arranged at a non-parallel angle between 30° and 60° relative to the surface 21, for example at least 30°, at least 35°, at least 40°, at least 45°, at least 50°, at least 55°, and/or less than 60°. However, embodiments where the authentication module 42 is arranged at another angle, such as toward a side of the door 20 for example or embodiments where the authentication module 42 is oriented substantially parallel to the surface 21 of the door 20 are also within the scope of the disclosure.

Figure 7A:
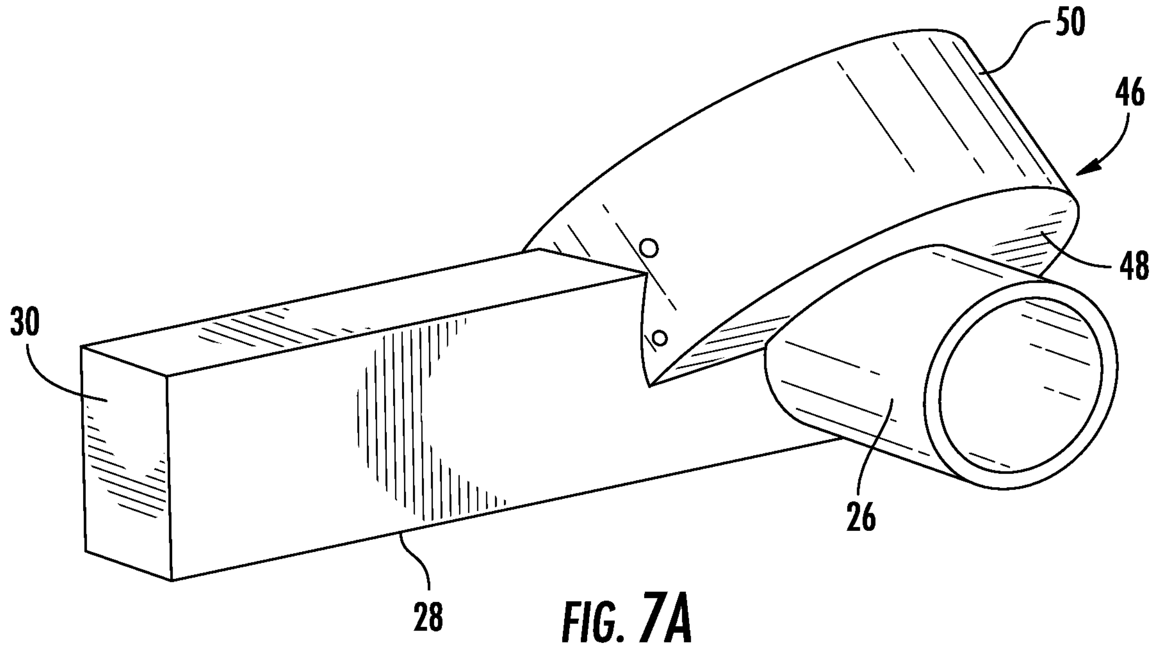
FIG. 7A is a rear perspective view of the handle assembly and a portion of the authentication module according to an embodiment.
Figure 7B:
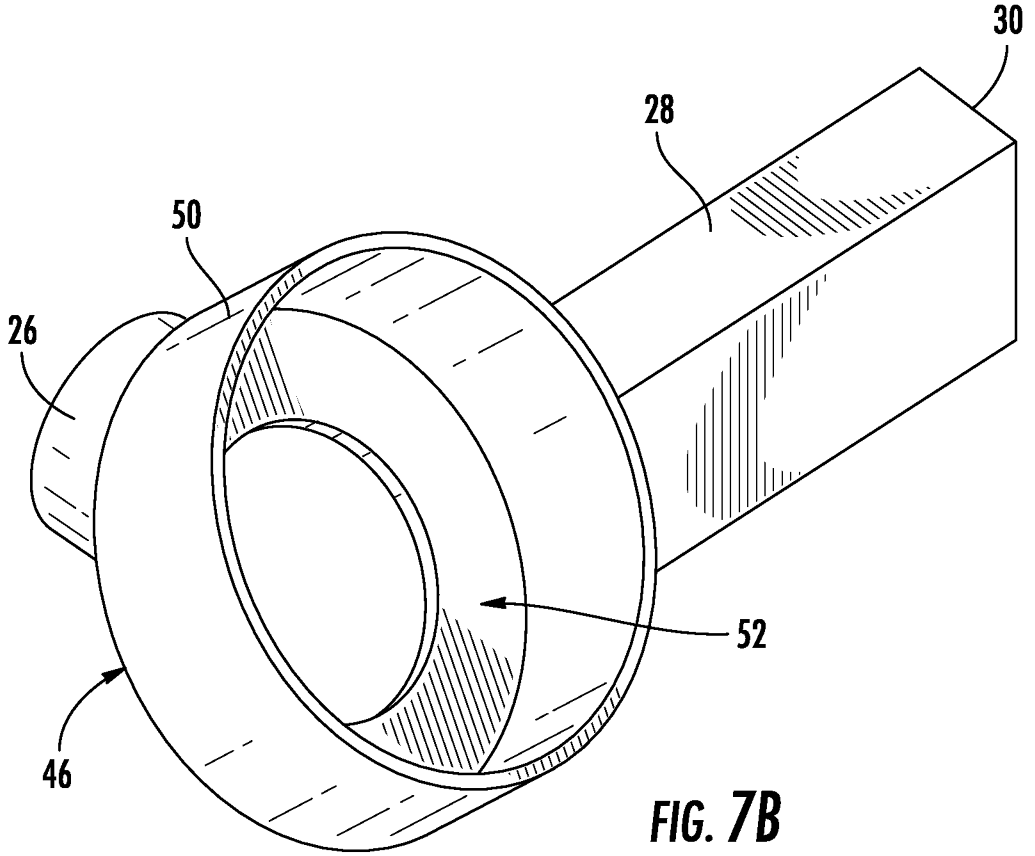
FIG. 7B is a front perspective view of the handle assembly and a portion of the authentication module according to an embodiment.

In the illustrated, non-limiting embodiment, the authentication module 42 includes a base or housing 46 and the housing 46 is mounted to a portion of the rod 26 extending from the surface 21 of the door 20. The housing 46 may be integrally formed with the rod 26. As shown in FIGS. 7A and 7B. However, in other embodiments, the housing may be a separate component permanently affixed to the rod 26, or may be removably mounted to the rod 26. Further, as shown in FIGS. 7A and 7B, the housing 46 may be integrally formed with the handle, alternatively to or in addition to the rod 26. However, embodiments where the housing 46 is separate from and permanently affixed to the handle 28 or removably mounted to the handle 28 are also contemplated herein. Accordingly, in such embodiments, the authentication module 42 may be configured to rotate about the axis of rotation X in unison with the handle 28. However, in other embodiments, the handle 28 and/or the rod 26 may be configured to move, for example rotate, relative to the housing 46 of the authentication module 42.

The housing 46 of the authentication module 42 may include a bottom 48 and one or more sidewalls 50 extending perpendicularly from the bottom 48 to define a cavity or hollow interior 52. A cover 54, such as formed from a plastic material for example, may be removably or permanently mounted to the sidewalls 50, opposite the bottom 48 to substantially seal the cavity 52 of the housing 46. The cover 54 may define the contact surface 44 of the authentication module 42.

One or more electronic components may be stored within the cavity 52 of the housing 46. In addition to a control board 60, in an embodiment, the electronic components of the authentication module 42 include at least one detector 62, such as an antenna, operably coupled to the control board 60. The at least one antenna 62 is configured to receive a transmission of data from a portable device 64, such as carried by a user or occupant. The antenna 62 may be located centrally relative to the housing 46 to facilitate communication between the antenna 62 and a portable device 64, such as a card for example, when the portable device 64 is brought to a position near a portion of the contact surface 44 of the authentication module 42. Alternatively, or in addition, the antenna 62 may be mounted about a periphery of the interior surface of the cavity 52. However, it should be understood that an authentication module 42 having one or more antennas 62 located at any suitable location are within the scope of the disclosure.

The antenna(s) 62 and the portable device 64 may be configured to communicate with one another via near field communication (NFC). However, any other type of communication enabled by the portable device 64 and the antenna 62, such as Bluetooth, a local or public data network, radio frequency, a cellular network, or any other wired or wireless network for example, are also within the scope of the disclosure.

The control board 60 of the authentication module 42 may be operably coupled to the actuator 40 of the door lock 22. In an embodiment, the control board is configured to communicate one or more commands to the actuator 40 to selectively engage or disengage the lock 38. The control board 60 may communicate with the actuator 40 wirelessly, or alternatively, may communicate via one or more wires extending between the control board and the actuator 40 or a control associated with the actuator 40. In an embodiment, a hole 66 is formed in the bottom 48 of the housing 46. This hole 66 may be aligned with the hollow interior of the rod 26 such that a continuous pathway extends from the cavity 52 of the housing 46 through the rod 26 to the actuator 40. Accordingly, in embodiments where the control board 60 and the actuator 40 are hard-wired together, one or more wires or cables may extend through the continuous pathway to couple the electronic components of the authentication module 42 with a portion of the door lock 22.

Figure 10:
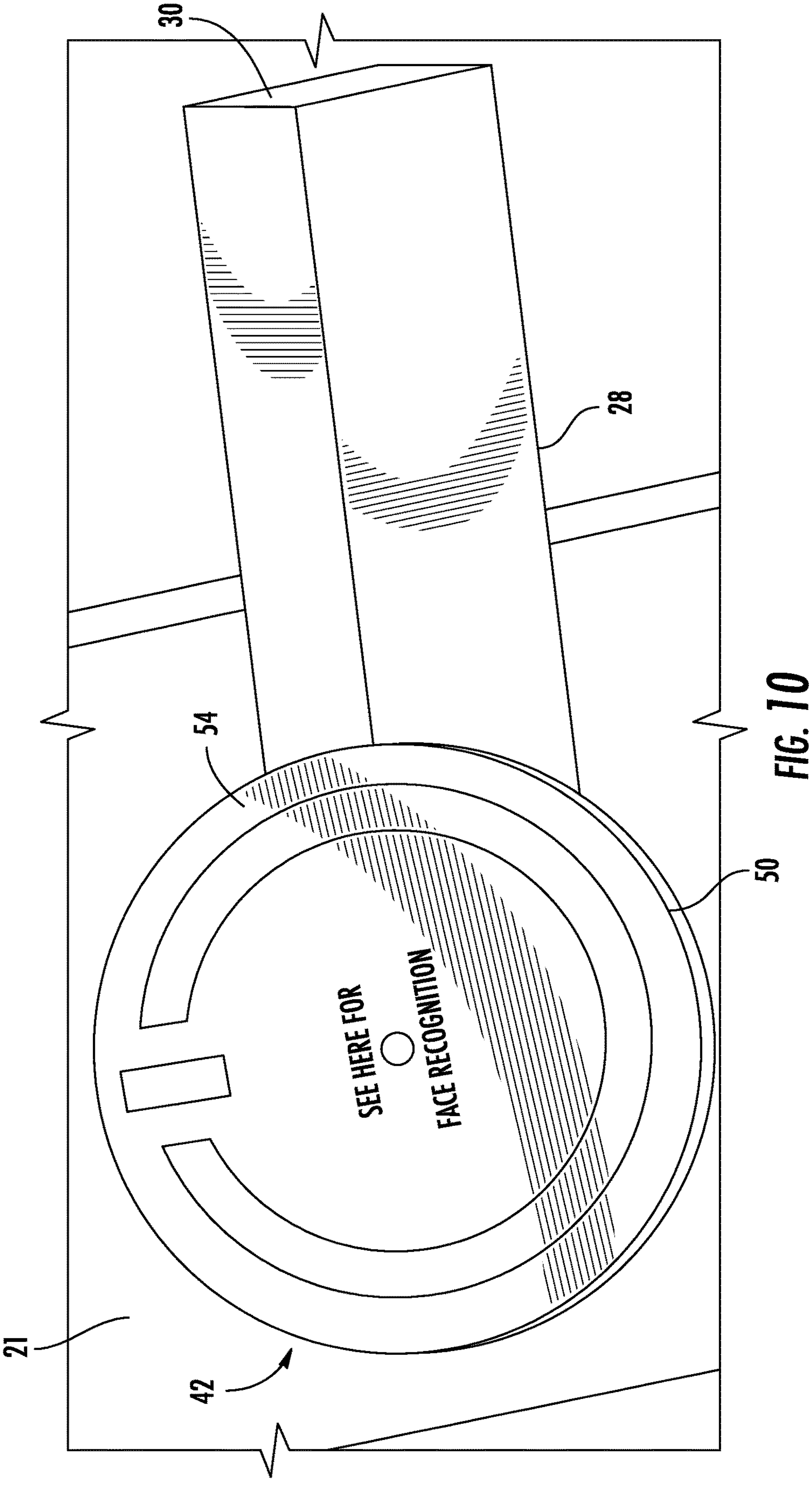
FIG. 10 is a perspective view of a door lock including an authentication module according to an embodiment.
Figure 11:
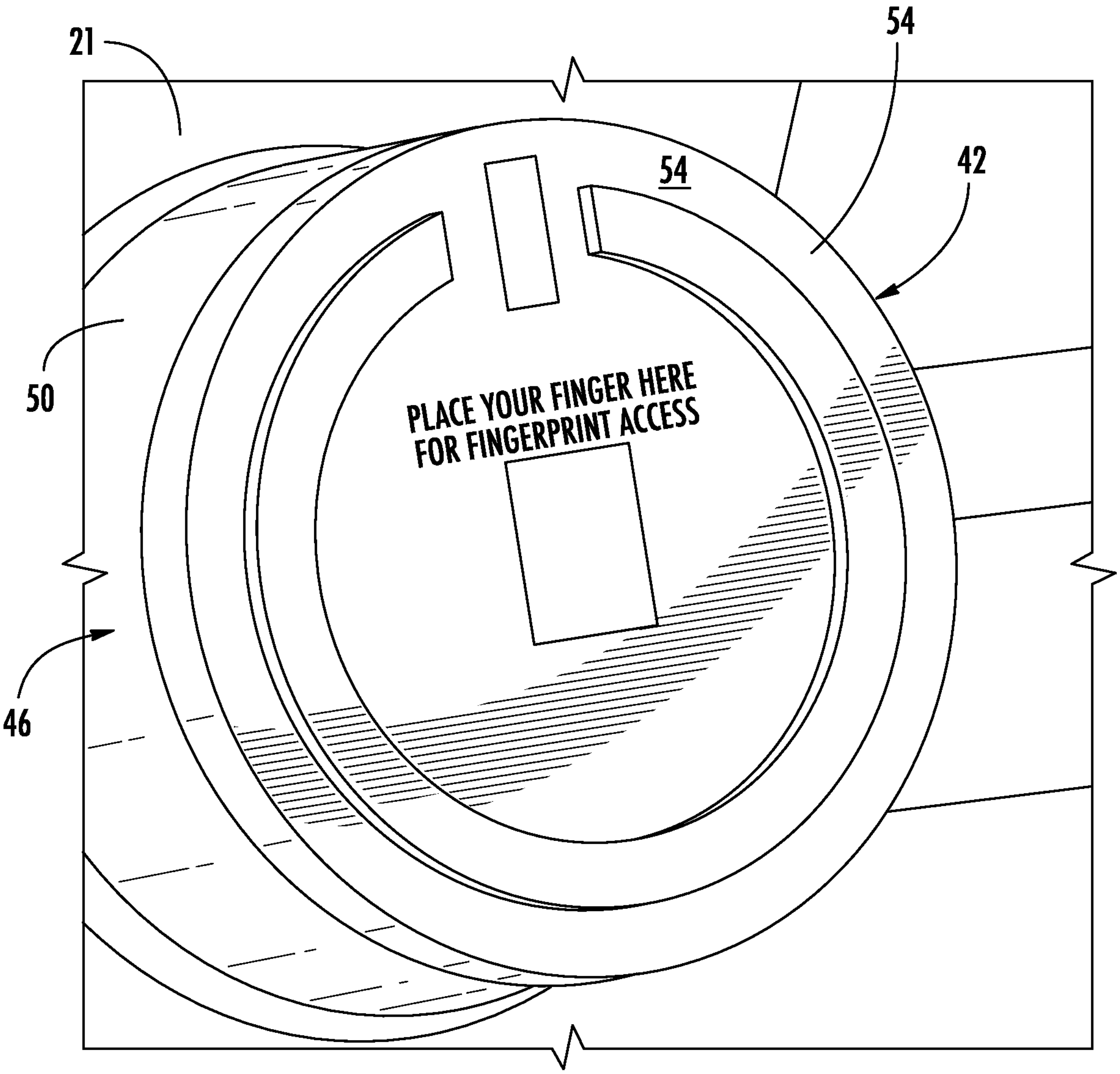
FIG. 11 is a detailed perspective view of an authentication module operable to perform a fingerprint authentication operation according to an embodiment.

In an embodiment, the detector of the authentication module 42 is suitable to perform one or more types of biometric recognition, such as a facial recognition/authentication operation (FIG. 10), a fingerprint recognition/authentication operation (FIG. 11), and an iris recognition/authentication operation. For example, in embodiments where the authentication module is configured to use facial recognition, the detector may be a camera. In such embodiments, the detector 62 or region of the cover 54 associated with the detector 62 may be arranged at the center of a logo displayed on the cover 54. As previously described, the authentication module 42 may be configured to adjust a position of the deadbolt 38 via the actuator 40 in response to valid authentication information being provided to the detector 62. In embodiments where the authentication module 42 is configured to perform a facial recognition operation, a portion of the authentication module 42, such as a portion of the contact surface 44 for example, may be reflective to indicate to a user where to look to operate the door lock 22.

Figure 4:
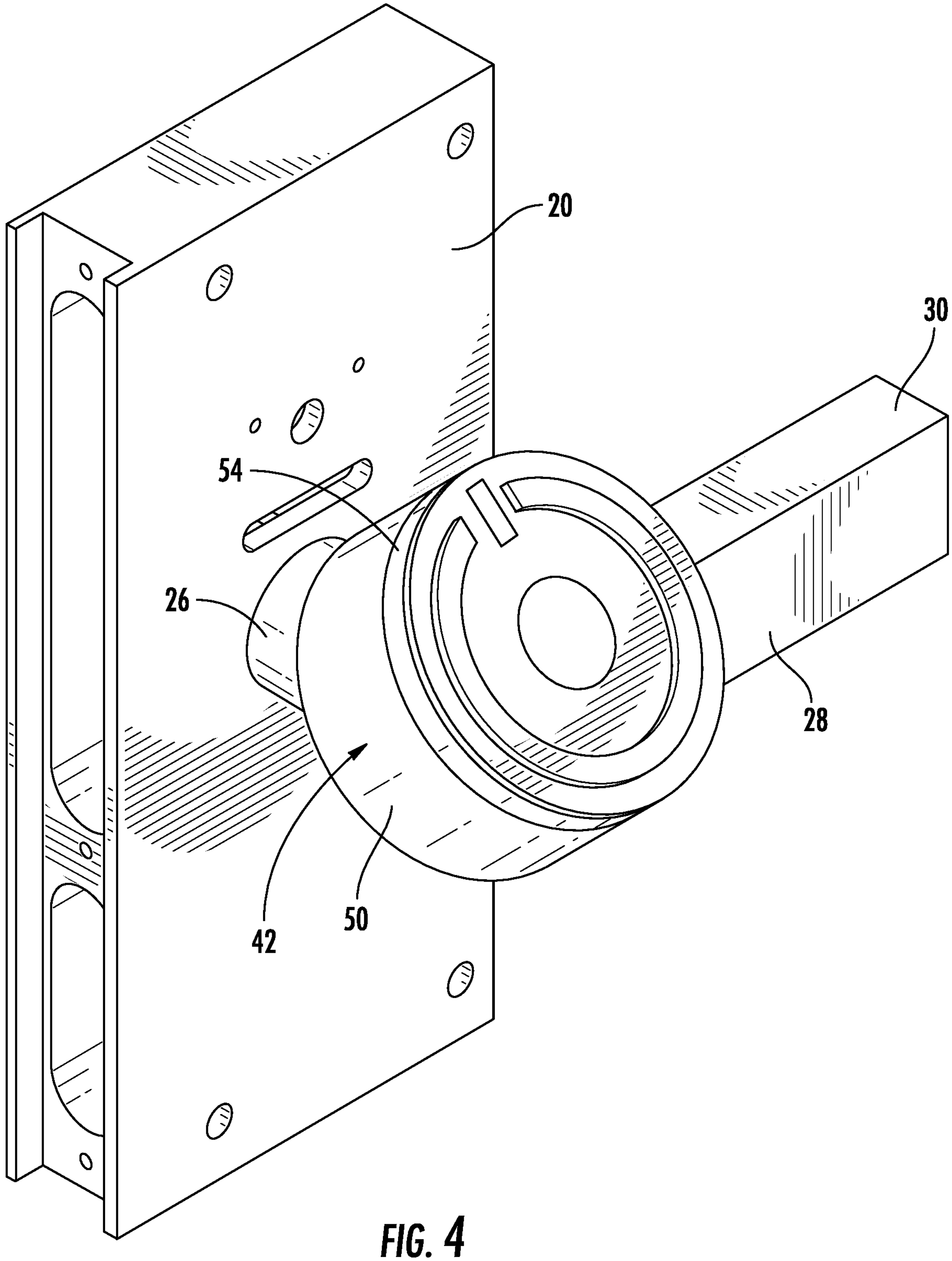
FIG. 4 is a perspective view of a door lock including an authentication module according to an embodiment.
Figure 5:
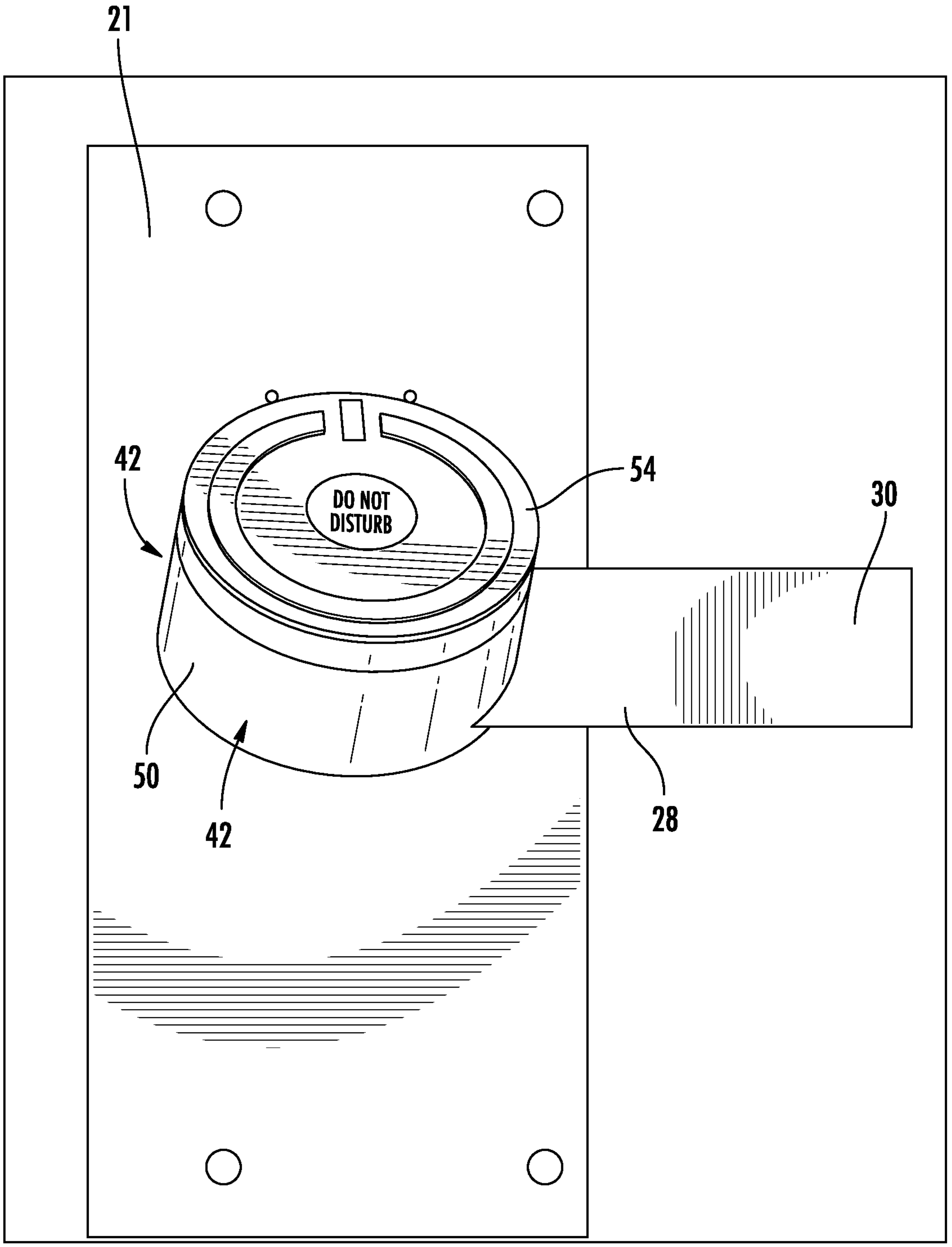
FIG. 5 is a front view of the door lock of FIG. 4 according to an embodiment.
Figure 6B:
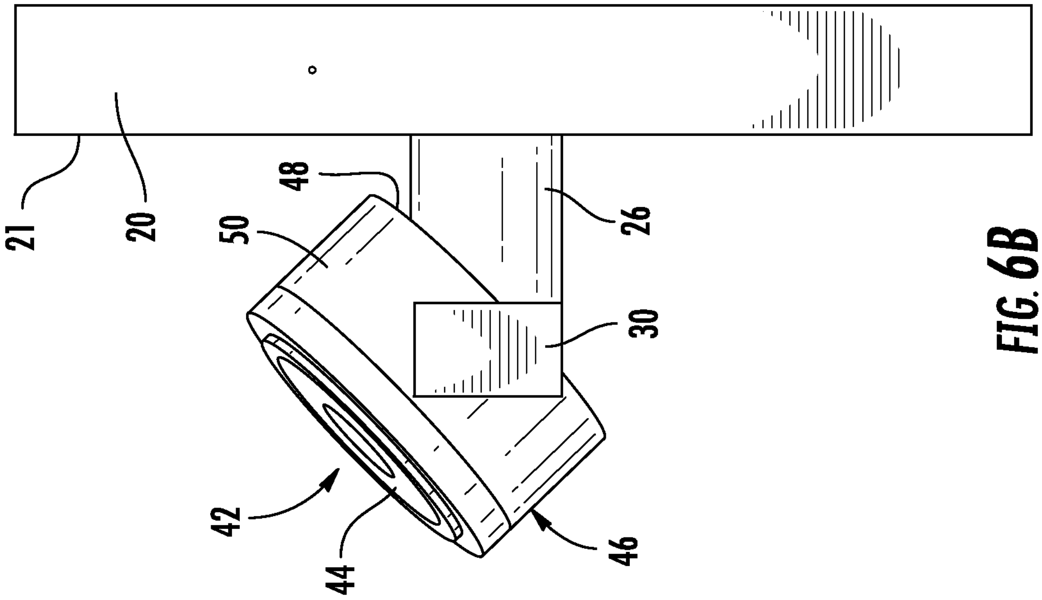
FIGS. 6A and 6B are side views of the door lock of FIG. 4 according to an embodiment.
Figure 6A:
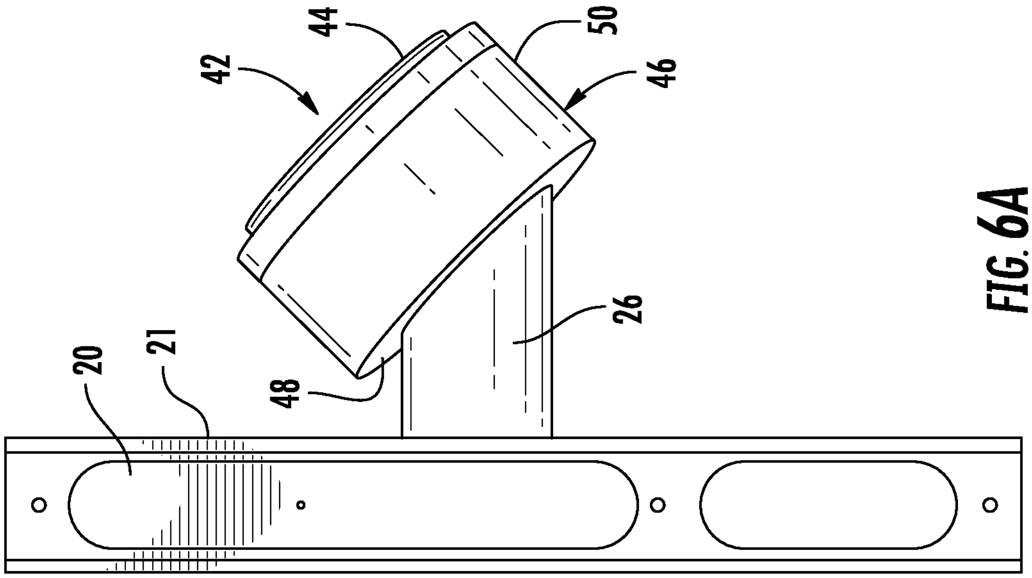
Figure 9:
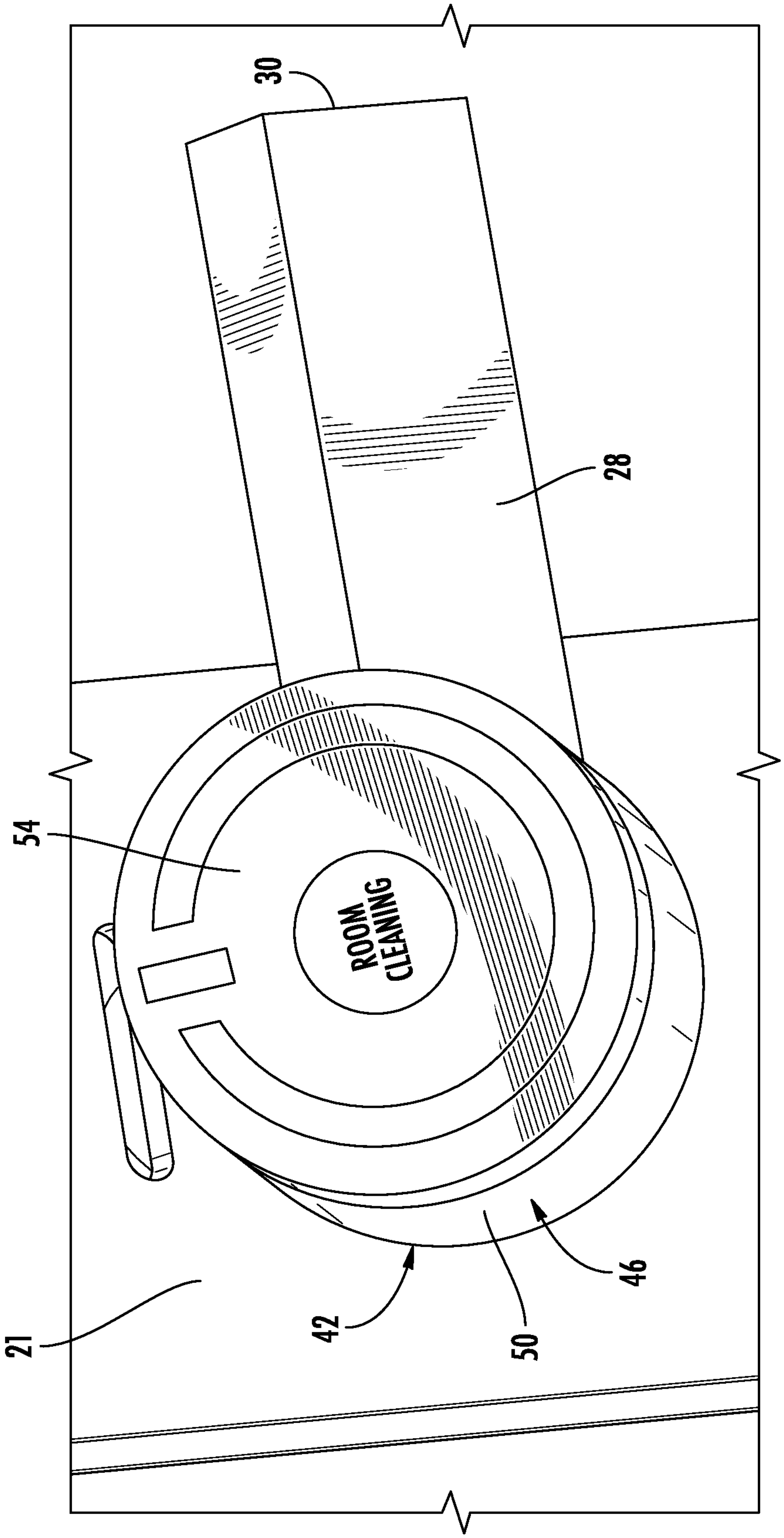
FIG. 9 is a perspective view of a door lock including an authentication module according to an embodiment.

Alternatively, or in addition to the authentication and operation of the door lock 22 described above, the authentication module 42 may be operable to provide a status indicator to a user located near the door lock 22. In such embodiments, at least one light emitting diode (LED) is arranged within the cavity 52 of the housing 46. At least a portion of the cover 54 of the authentication module 42 may be transparent and the one or more LEDs may be operable to illuminate one or more static display messages. For example, as shown in FIGS. 4, 5, and 9, the one or more LEDs may be operable to illuminate a display message that the “room requires cleaning”, “do not disturb”, “welcome”, “low battery”, “maintenance is required” and/or any other suitable message. The one or more LEDs may be distinct components or may be part of a screen, such as a liquid crystal display (LCD) screen for example. In embodiments where the at least one LED is part of an LCD screen, the screen may be formed as part of the cover, or may be arranged directly beneath the cover. In an embodiment, the static messages are displayed within the center of the logo formed on the cover 54 or the LCD screen.

In addition to the static messages described above, in an embodiment, the cover 54 of the authentication module or the LCD screen positioned adjacent to the cover 54 is operable as a video display panel. In such embodiments, the electronic components of the authentication module 42 include a microphone and a speaker such that a user standing adjacent to the authentication module is able to interact with, and more specifically both hear and respond to, the message being played. Inclusion of the video display panel and the corresponding electronic components may allow the authentication module 42 to perform video conferencing (like facetime). Accordingly, operation of the authentication module 42 by a user may initiate a video call with an assistant, such as the front desk staff at a hotel for example.

Figure 12:
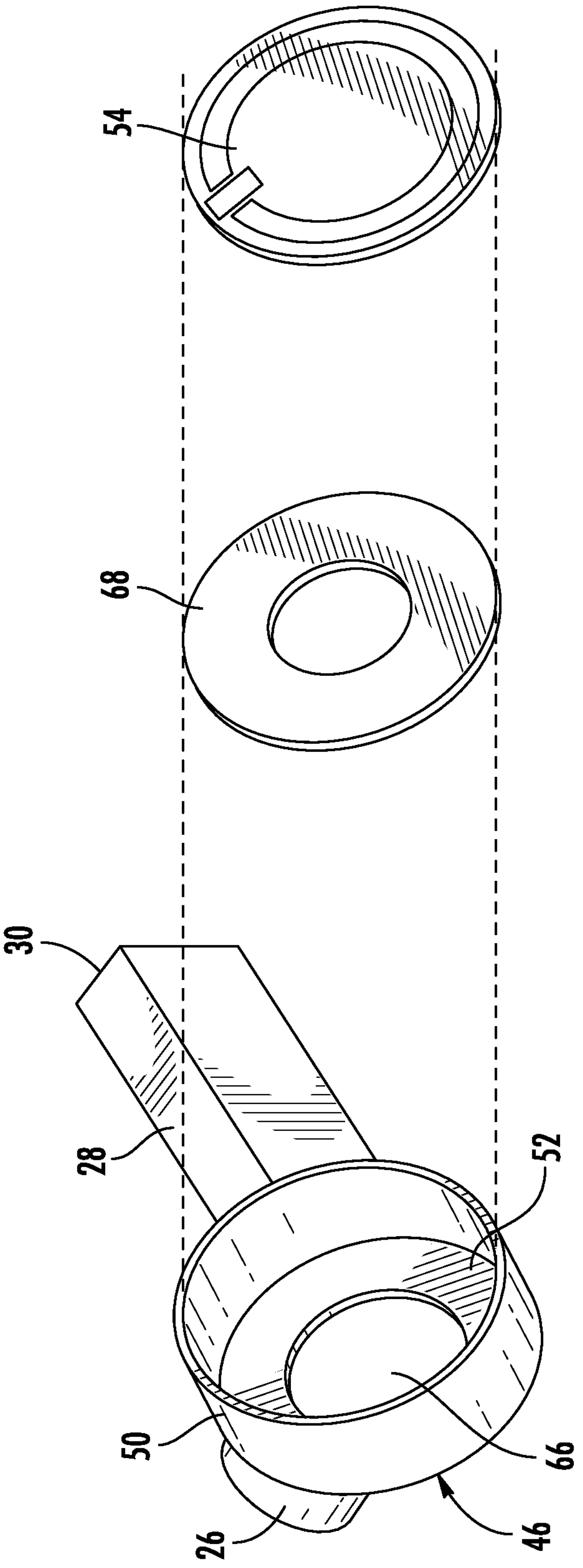
FIG. 12 is an exploded view of self-sanitizing authentication module according to an embodiment.

With reference now to FIG. 12, in an embodiment, a container of sanitizer 68 may be arranged within cavity 52 of the housing 46 of the authentication module 42. Further, a plurality of holes (not shown) may be formed in the housing 46, such as in the bottom 48 and/or the sidewalls 50 thereof. In response to receipt of valid authentication data, the operation of the door lock 22 is configured to release sanitizer from the container 68 onto the handle 28 and/or the rod 26 via the holes formed in the housing 46. In an embodiment, the sanitizer is released in the form of a mist or atomized fluid. Accordingly, in such embodiments, the door lock 22 and authentication module 42 may be considered to be self-sanitizing.

A door lock 22 including an authentication module 42 located offset from the surface of the door as illustrated and described herein is able to more effectively receive a signal from a portable device 64 regardless of whether the portable device 64 is directly aligned with the antenna 62. Further, by locating the authentication module 42 at the front of the door handle 28, the authentication module 42 can be angled, thereby providing greater visibility to an operator and allowing for enhanced operations, such as facial recognition for example. In addition, this position of the authentication module 42 relative to the door handle 28 allows a desired logo to be displayed on the authentication module 42 without interference.

The term “about” is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for a door comprising:

a door lock including a lock movable between an engaged position and a disengaged position and a handle assembly, the handle assembly including a rod rotatably mounted to the door and a handle coupled to the rod, the handle being oriented at a non-parallel angle relative to the rod, wherein the handle and the rod are rotatable about an axis; and an authentication module operably coupled to the lock, the authentication module having a housing arranged mounted to an exterior of the handle assembly, wherein the housing extends vertically above the handle, wherein the housing of the authentication module and the handle assembly are movable about the axis of rotation in unison.

2. The system of claim 1, wherein the housing of the authentication module is oriented at a non-parallel angle to the surface of the door.

3. The system of claim 1, wherein the housing of the authentication module is mounted adjacent to an end of the handle assembly.

4. The system of claim 1, wherein the housing is integrally formed with the handle assembly.

5. The system of claim 1, wherein the housing of the authentication module extends forward of the handle assembly.

6. The system of claim 1, wherein the authentication module is configured to actuate the lock from the engaged position to the disengaged position in response to receiving valid authentication data.

7. The system of claim 6, wherein the valid authentication data is provided by a portable device.

8. The system of claim 6, wherein the authentication module further comprises:

a cover connected to the housing to define a cavity between the housing and the cover; and a control board and at least one detector for receiving authentication data arranged within the cavity.

9. The system of claim 8, wherein a logo is displayed on the cover and a detection region associated with the at least one detector is arranged at a center of the logo.

10. The system of claim 8, wherein the authentication module is configured to perform a biometric recognition operation.

11. The system of claim 8, wherein the at least one detector is an antenna, and the antenna extends about a periphery of the cavity.

12. The system of claim 8, wherein the door lock further comprises an actuator connected to the lock, the control board being arranged in communication with the actuator.

13. The system of claim 12, wherein the control board is hard-wired to the actuator via at least one wire.

14. The system of claim 13, wherein the at least one wire extends from the cavity through a portion of the handle assembly.

15. The system of claim 8, wherein the control board is configured to wirelessly communicate with the actuator.

* * * * *